UNITED STATES PATENT OFFICE.

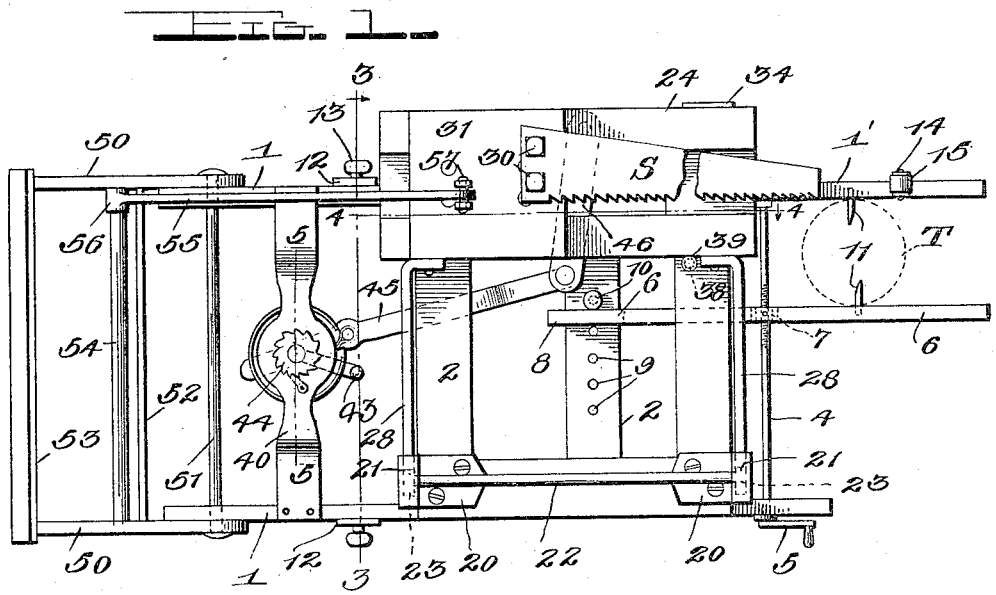
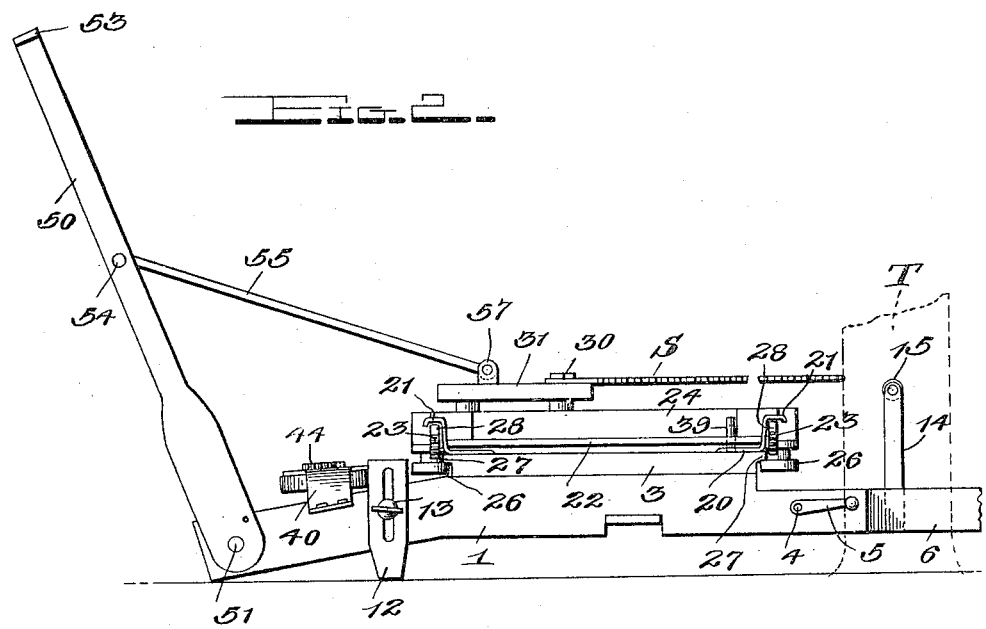

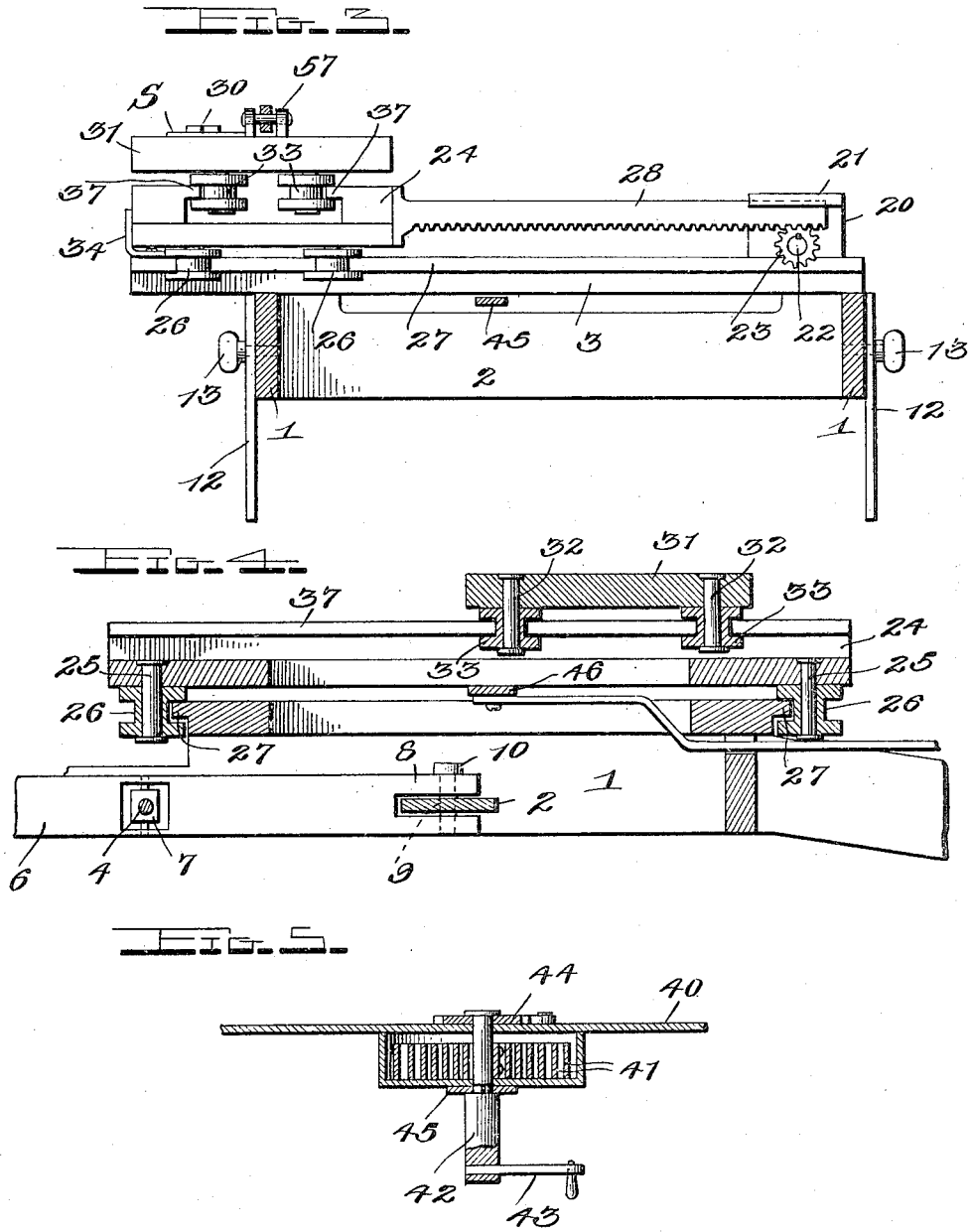

FRED W. BOWKER AND DANIEL W. SMITH, OF MACHIAS, MAINE, ASSIGNORS, BY MESNE ASSIGNMENTS, TO FOREST KING MACHINE COMPANY, OF MACHIAS, MAINE, A CORPORATION OF MAINE.

TREE-SAWING MACHINE.

1,127,172.   Specification of Letters Patent.   Patented Feb. 2, 1915.

Application filed October 6, 1913.   Serial No. 793,699.

*To all whom it may concern:*

Be it known that we, FRED W. BOWKER and DANIEL W. SMITH, citizens of the United States, residing at Machias, in the county of Washington and State of Maine, have invented certain new and useful Improvements in Tree-Sawing Machines; and we do declare the following to be a full, clear, and exact description of the invention, such as will enable others skilled in the art to which it appertains to make and use the same.

This invention relates to sawing machines, and more especially to those having a reciprocating saw actuated by a lever; and the object of the same is to produce a compact, strong, and portable machine for sawing down trees of large or small size. This object is brought about by certain improvements in details as will be more fully described in the following specification and claims, and as shown in the drawings wherein—

Figure 1 is a plan view of this machine and Fig. 2 a right side elevation thereof; Figs. 3, 4, and 5 are cross sections on the lines 3—3, 4—4 and 5—5 respectively of Fig. 1, taken on a larger scale.

Referring to the drawings by reference numerals, the base comprises two parallel sills 1 connected by suitable cross beams 2, one of the sills having a forward extension 1' beyond the forward end of the other for a purpose yet to appear, and mounted on this base is a bed 3 which is a frame-like structure for sake of lightness and accessibility to the parts beneath. The front ends of the two sills are connected by a screw 4 swiveled therein and having a knob or handle 5 on one end, and a beam 6 constituting a jaw having a nut 7 on said screw, and the beam has its inner end forked as at 8 and standing astride one of the cross beams 2, the latter being provided with holes 9 to receive a pin 10 so that the position of this forked end may be adjusted. When so adjusted by setting the pin in the proper hole, turning of the screw in the proper direction moves the forward end of the jaw 6 toward or from the extension 1' so that inwardly projecting dogs or spurs 11 on said extension and jaw may be forced into the tree T which is to be cut. It is obvious that by properly adjusting the pin 10 and manipulating the screw, this machine may be made to accommodate itself to trees of various sizes within certain limits. The rear ends of the sills 1 are supported by legs 12 pivotally connected therewith by set screws 13, and when these legs are turned downward and the set screws set up tight, the base and the entire machine may be adjusted to accommodate uneven places in the ground so that the saw blade S will work in a strictly horizontal plane and will cut off the tree T at a point to leave as short a stump as possible. Rising from the extension 1' is a post 14 carrying a roller 15 at or near its upper end, upon which roller the saw S may scarf itself straight in a manner well known to lumbermen. Near the corners of the bed 3 at one side of the same are mounted bearings 20 having hooked upper ends 21, and in said bearings is journaled a shaft 22 carrying gear wheels 23 at its exteremities beneath said hooks.

The numeral 24 designates the saw carriage having at its front and rear ends depending pins 25 on which are mounted grooved wheels 26 traveling on tracks 27 formed by projecting the forward and rearward edges of the respectively front and rear cross bars of said bed 3, and from said carriage project two rack bars 28 which pass under the hooks 21 with their teeth engaging the gears 23. The fact that the latter are rigidly mounted on a single shaft 22 necessitates their rotation in unison, and the fact that rack bars are connected with the two gears and fastened to the carriage necessitates the lateral movement of the front and rear ends of the carriage in unison, and this we consider an important feature of the invention.

The saw blade S is secured by bolts or screws 30 to a saw-head 31 which is a block-shaped structure overlying the carriage 24 and provided on its under side with depending pins 32 carrying grooved rollers 33, the grooves in the latter engaging tracks 37 formed by projecting the inner edges of the side bars of the carriage 24 inward toward each other as seen in Fig. 3, and this arrangement maintains the saw head and the saw blade ever in their correct relative positions with respect to the carriage, while yet permitting the head to be withdrawn from the rear end of the carriage by pulling its grooved rollers off the tracks 37. The screws or bolts 30 permit the removal of the saw blade S and replacement by another when it becomes dull. We lay no special claim to the structure of the saw itself, as it is obvious that the user will employ such a blade as the necessities of the case require. In one of the cross bars of the bed 3 is an aperture or hole 38 which is so located that when a plug 39 is inserted therein alongside the carriage, the latter is held at the extreme left and resting against a stop 34 in which position it remains while the machine is transported from place to place.

The saw feeding mechanism is mounted on a bracket or cross bar 40 carried by the sills 1 in rear of the bed 3. By preference this comprises a strong spiral spring 41 connected at one end with a winding mechanism 42 adapted to be actuated by a key or crank 43 and held when wound by a ratchet mechanism 44; and a lever 45 connected with the other end of the spring and projecting beneath the bed 3, the forward end of this lever being pivotally connected by means of a link 46 with the carriage 24. From time to time the operator will wind the spring mechanism so as to put tension on the spring, and the latter exerts a constant tendency to move the carriage toward the tree without the necessity for further attention on the part of the operator. However, we would not have the tension of the spring so strong that the operator may not move the carriage back to the left against the stop 34 and reinsert the plug 39 when he is preparing the machine for attachment to a new tree to be cut down.

The mechanism for reciprocating the saw comprises a handle, and connections between it and said head 31. The handle is formed of two side bars 50 pivoted at their lower ends at 51 to the rear ends of the sills 1, and connected by a rung 52, at their upper ends by a hand-hold 53. The connection between this handle and the head consists of a cross rod 54, a link 55 having a ball bearing 56 at one end mounted on said rod and pivotally connected at its other end at 57 with the head 31. When now the handle is moved to and fro by the operator who stands behind the machine, this link causes the reciprocation of the head 31 on the carriage and the movement of the saw blades S across the tree T, and meanwhile the feed mechanism actuated by the expansion of the spiral spring causes the lateral movement of the carriage across the bed 3.

With a machine of this kind a single operator may cut down a tree of considerable size. He first dogs the jaws 1' and 6 at the points 11 to opposite sides of the tree T, and then adjusts the legs 12 by the set screw 13 so that the sills and the bed stand substantially horizontal and the saw blade S engages the roller 15 at a point to hold it horizontal and as low as possible against the side of the tree to be cut. He then winds up the spring, and withdrawing the plug from the hole 38 he permits the feed mechanism to throw the saw teeth against the side of the tree. Grasping the hand hold 53, he reciprocates the handle, and this motion is communicated through the link 55 to the head 31 so that the saw blade is caused to act on the tree. As the carriage 24 is fed toward the tree the link 55 moves with it and its ball bearing connection 56 slides along the cross rod 54.

The parts of this machine may be of the desired sizes, shapes, proportions, and materials, but we prefer wood throughout excepting for the hardware which latter is of the simplest character and may be bought in open market. We do not wish to be limited to details of construction, as considerable alteration may be made therein without departing from the principle of this invention.

What is claimed as new is:

1. In a sawing machine of the class described, the combination with a base including a pair of sills whereof one has a forward extension and cross beams connecting said sills, a bed superimposed on the base, a carriage movable laterally across the bed and the sawing mechanism mounted on said base, of a screw swiveled in one sill and the extension of the opposite sill, a handle at one end of said screw, a jaw having an opening therein, a nut pivoted to said opening and threaded onto the body of the screw, a fork at the rear end of said jaw loosely embracing one of said cross beams, the latter being provided with a series of holes, a pin removably mounted in the latter, and spurs projecting from the contiguous faces of said jaw and extension, for the purpose set forth.

2. In a sawing machine of the class described, the combination with a base including a pair of sills, bracing means therefor, an extension on one of said sills designed to form a jaw, and a sawing mechanism mounted on the base; of a screw mounted for rotation in one of said sills and in the extension on the other sill, means for rotating said screw in its bearings, an elongated jaw member having an opening therein through which said screw is disposed, a nut pivotally mounted in the opening of said last mentioned jaw and engaged with the threaded portion of the screw, means for pivotally and adjustably securing one end of the last mentioned jaw member to a portion of the bracing means between said sills, and means in connection with said jaw members for the engagement thereof with an object.

3. In a sawing machine of the class described, the combination with a base including a pair of parallel sills, transverse bracing beams connecting the same, the bracing beam adjacent the forward end of the base being provided with a plurality of registering openings, a forwardly projecting extension formed on one of said sills providing a stationary jaw thereon and a sawing mechanism mounted on the base; of a movable jaw member of elongated design having the inner end thereof bifurcated and receiving the last mentioned beam therein, a pin insertible in said registering openings and adapted for abutment against the bifurcated end of said movable jaw whereby to pivotally and adjustably retain the same on said beam, means in connection with said sills and an intermediate portion of the movable jaw whereby to dispose the latter to various positions with respect to the stationary jaw, and means in connection with said jaw members for the engagement thereof with an object.

In testimony whereof we have hereunto set our hands in presence of two subscribing witnesses.

FRED W. BOWKER.
DANIEL W. SMITH.

Witnesses:
A. D. McFAUL,
LUCINDA ARMSTRONG.

Copies of this patent may be obtained for five cents each, by addressing the "Commissioner of Patents, Washington, D. C."